United States Patent
Wernicke

(10) Patent No.: US 8,410,981 B1
(45) Date of Patent: Apr. 2, 2013

(54) MANAGING DIMENSIONAL ERROR IN A DIRECTION FINDING ANTENNA ARRAY

(75) Inventor: Kent A. Wernicke, Grapevine, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 235 days.

(21) Appl. No.: 13/027,879

(22) Filed: Feb. 15, 2011

(51) Int. Cl.
*G01S 5/02* (2010.01)

(52) U.S. Cl. .................................................. 342/420

(58) Field of Classification Search .................. 342/420
See application file for complete search history.

(56) References Cited

U.S. PATENT DOCUMENTS

| | | | | |
|---|---|---|---|---|
| 5,446,465 | A * | 8/1995 | Diefes et al. | 342/357.34 |
| 6,421,003 | B1 * | 7/2002 | Riley et al. | 342/357.38 |
| 2005/0062647 | A1 * | 3/2005 | Marks | 342/428 |
| 2005/0156780 | A1 * | 7/2005 | Bonthron et al. | 342/107 |
| 2010/0045522 | A1 * | 2/2010 | Montgomery et al. | 342/357.12 |

* cited by examiner

*Primary Examiner* — Harry Liu
(74) *Attorney, Agent, or Firm* — Donna P. Suchy; Daniel M. Barbieri

(57) ABSTRACT

An antenna assembly may include an antenna array having a plurality of antenna elements generally arranged along an axis. The antenna array may include a first antenna element for receiving at least one signal from a signal source, and a second antenna element spaced a distance apart from the first antenna element for receiving the at least one signal from the signal source. The antenna assembly may also include a processor coupled with the antenna array for analyzing the at least one signal and utilizing the distance between the first antenna element and the second antenna element to determine at least one of a direction or a location of the signal source. The antenna assembly may further include a memory coupled with the processor for storing a correction factor, where the processor is configured to utilize the correction factor to determine the distance between the first antenna element and the second antenna element.

19 Claims, 5 Drawing Sheets

MANAGING DIMENSIONAL ERROR IN A DIRECTION FINDING ANTENNA ARRAY

TECHNICAL FIELD

The present disclosure generally relates to the field of electronic signal reception, and more particularly to managing dimensional error in a direction finding antenna array.

BACKGROUND

Linear interferometer direction finding antenna arrays are utilized for intercept and direction finding of Radio Frequency (RF) emitters, such as radar or communication emitters. The accuracy of a linear interferometer direction finding antenna array is limited, at least in part, by the placement accuracy of the various antenna elements within the array. For example, placement errors on the order of between +/−0.003 inches and +/−0.005 inches may contribute a significant amount of direction finding error. These placement errors may result from the stack up of multiple tolerances, including tolerances from antenna element fabrication, methods for mounting antenna elements to an antenna base plate, and tolerances allowed in the fabrication of an antenna base plate. The accuracy of a linear interferometer direction finding antenna array may also be limited by the thermal expansion and contraction of the antenna base plate. The distance between the two farthest separated antenna elements in the antenna array may be of specific concern.

SUMMARY

An antenna assembly may include an antenna array having a plurality of antenna elements generally arranged along an axis. The antenna array may include a first antenna element for receiving at least one signal from a signal source, and a second antenna element spaced a distance apart from the first antenna element for receiving the at least one signal from the signal source. The antenna assembly may also include a processor coupled with the antenna array for analyzing the at least one signal received by the first antenna element and the second antenna element and utilizing the distance between the first antenna element and the second antenna element to determine at least one of a direction or a location of the signal source. The antenna assembly may further include a memory coupled with the processor for storing a correction factor, where the processor is configured to utilize the correction factor to determine the distance between the first antenna element and the second antenna element.

A method for managing a position error of a plurality of antenna elements within an antenna assembly may include using a computer or processor to perform the steps of storing a correction factor for an antenna array; receiving at least one signal from a signal source utilizing a first antenna element of the antenna array; receiving the at least one signal from the signal source utilizing a second antenna element of the antenna array, where the second antenna element is spaced a distance apart from the first antenna element; determining the distance between the first antenna element and the second antenna element utilizing the correction factor; and analyzing the at least one signal received by the first antenna element and the second antenna element utilizing the determined distance between the first antenna element and the second antenna element to determine at least one of a direction or a location of the signal source.

A linear interferometer direction finding antenna assembly may include an antenna array having a plurality of antenna elements generally arranged along an axis. The antenna array may include a first antenna element for receiving at least one signal from a signal source, a second antenna element spaced a distance apart from the first antenna element for receiving the at least one signal from the signal source, and a third antenna element interposed between the first antenna element and the second antenna element generally along the axis of the antenna array for receiving the at least one signal from the signal source. The antenna assembly may also include a processor coupled with the antenna array for analyzing the at least one signal received by the first antenna element, the second antenna element, and the third antenna element utilizing the distance between the first antenna element and the second antenna element to determine at least one of a direction or a location of the signal source. The antenna assembly may further include a memory coupled with the processor for storing a correction factor, where the processor is configured to utilize the correction factor to determine the distance between the first antenna element and the second antenna element.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Referring generally to FIGS. 1A through 5, a method for managing a position error of antenna elements within an antenna assembly is described. By managing the position error of the antenna elements, the Direction Finding (DF) error of a linear phase interferometer antenna assembly, for example, may be reduced. Two factors that may contribute to the error or uncertainty of the distance between antenna elements are (A) allowed tolerances in the fabrication process and (B) thermal expansion/contraction of an antenna assembly. One technique for reducing such error sources would be to utilize improved fabrication techniques, such as allowing machining tolerances of less than +/−0.001 inches. Another technique for reducing such error sources would be to utilize materials having very low coefficients of thermal expansion, such as composite materials, or the like. However, these techniques may significantly increase product cost.

In some specific instances, the above-described error sources may result in DF errors on the order of between 0.02° and 0.05°. Such errors may be significant compared to a 0.1° DF accuracy, which may be obtainable with a linear phase interferometer antenna assembly, for example. Accordingly, the present disclosure describes a method for managing position error of antenna elements within an antenna assembly due to fabrication tolerances and/or thermal effects.

Figure 1A:
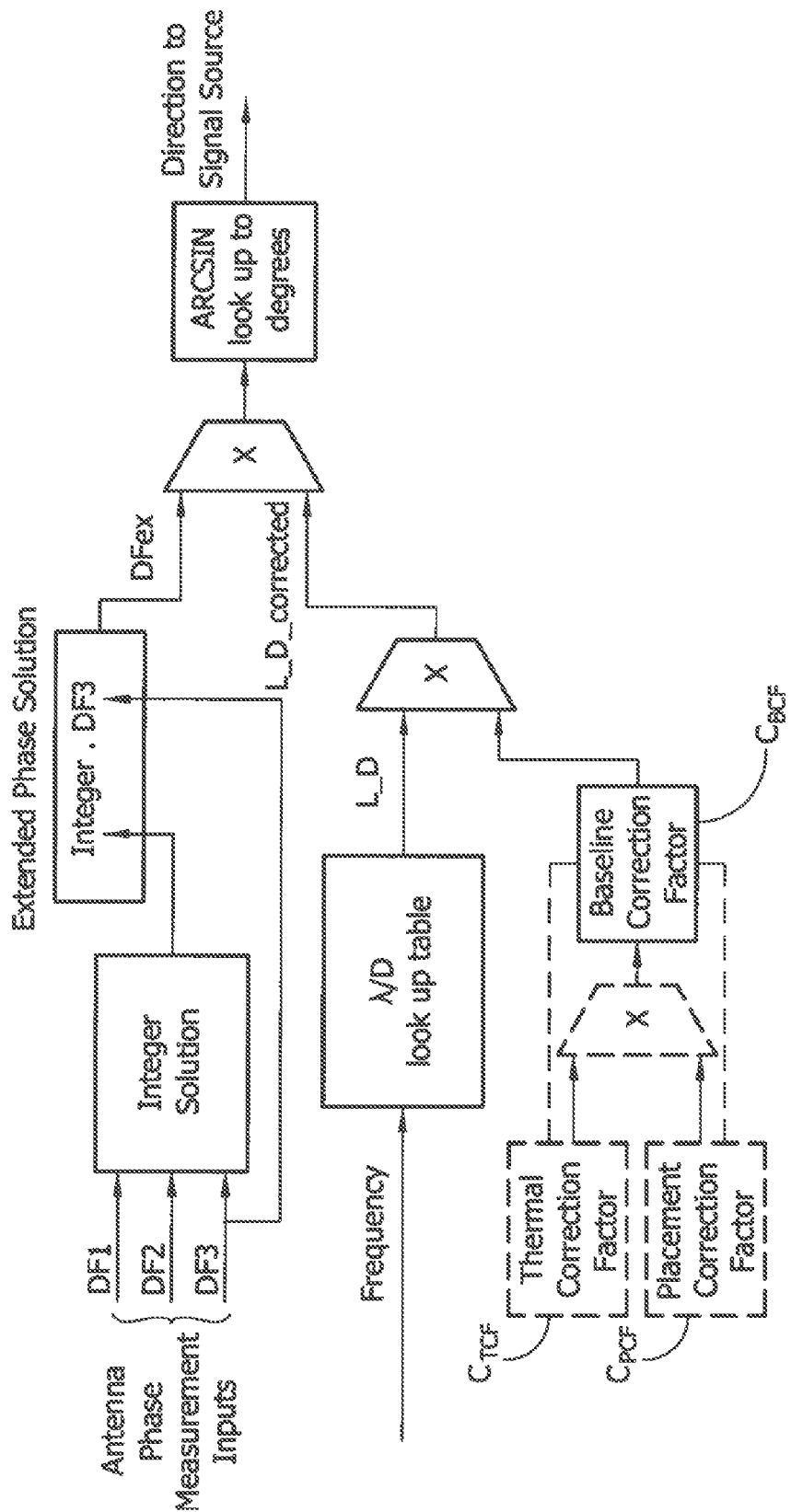
FIG. 1A is a schematic illustrating a generalized layout of an algorithm for a four-element linear phase interferometer antenna assembly.
Figure 1B:
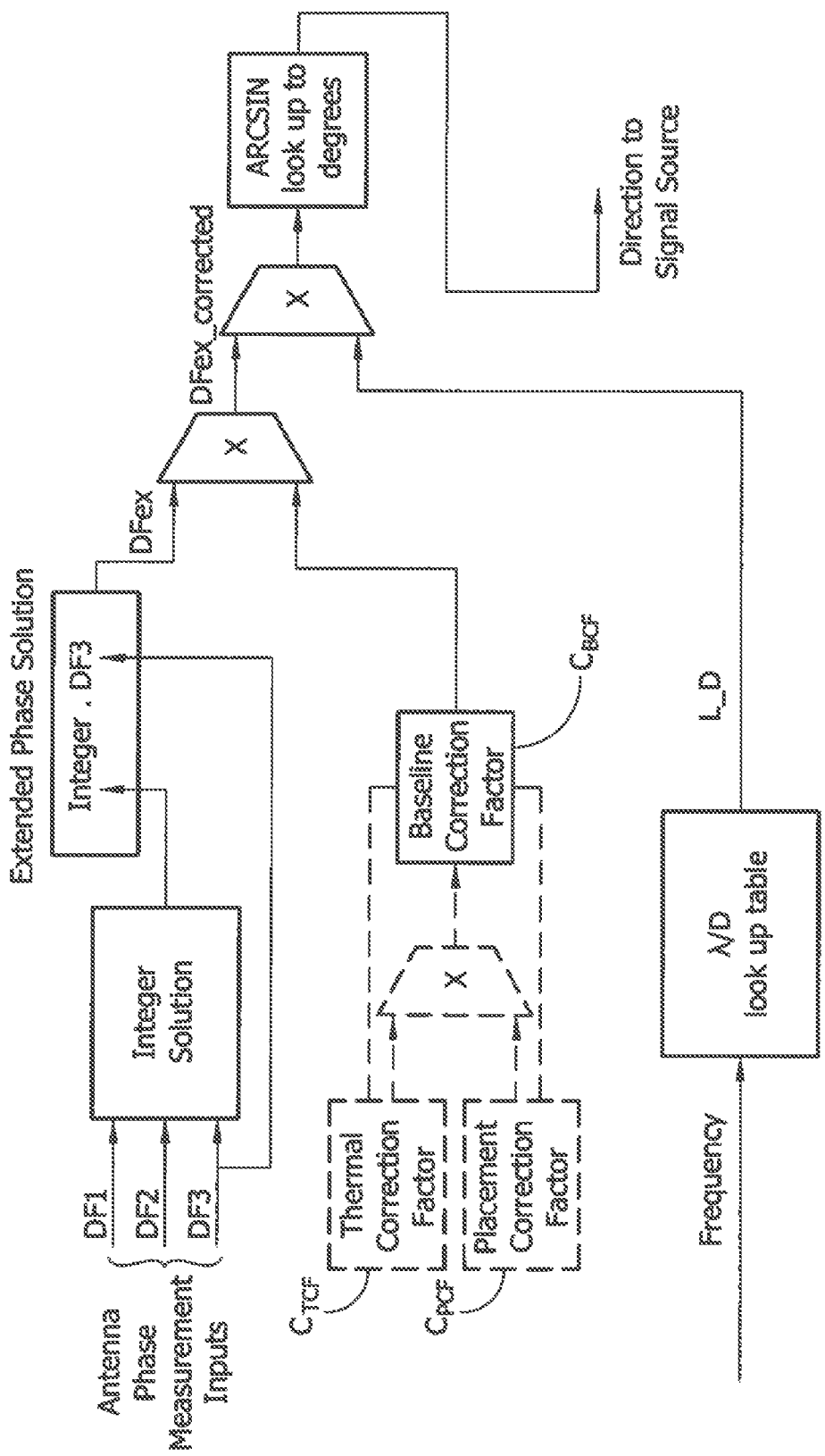
FIG. 1B is a schematic illustrating another generalized layout of an algorithm for a four-element linear phase interferometer antenna assembly.
Figure 2:
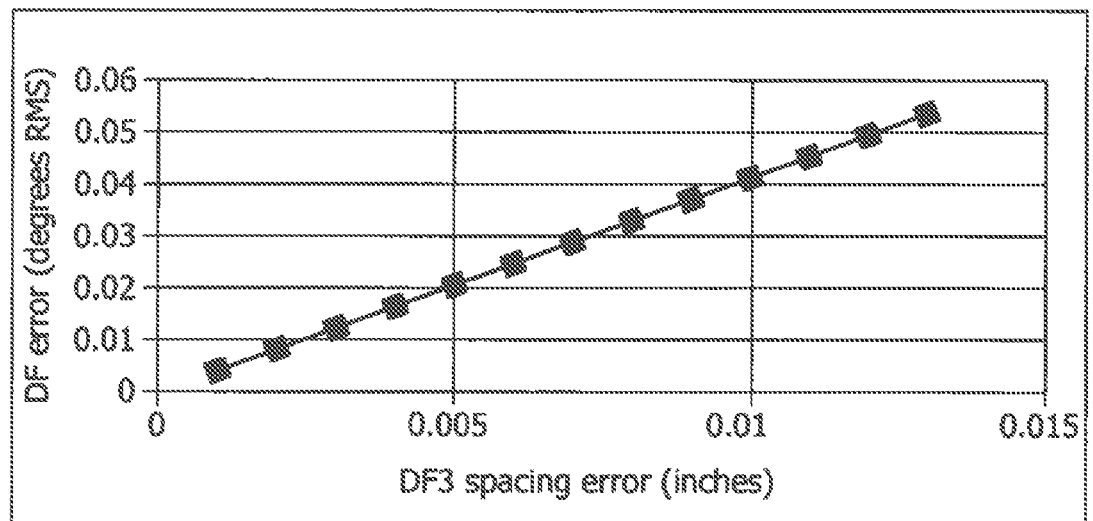
FIG. 2 is a graph illustrating Direction Finding (DF) errors resulting from a range of errors in the array spacing of a particular antenna array.

Referring to FIGS. 1A and 1B, generalized layouts of real time operational DF algorithms for a four-element linear phase interferometer antenna assembly are described. With reference to these particular layouts, the DF1 and DF2 phase measurements may be utilized to determine the integer portion of an extended phase solution. The DF3 phase measurement may also be utilized to determine the integer portion, and may be utilized as the fractional part of the solution. Thus, without correcting for position error, the effect of the DF3 spacing uncertainty (i.e., the spacing uncertainty of the two antenna elements spaced apart along the long baseline of the antenna array) may appear in the extended phase solution. This error may be induced when the extended phase solution is multiplied by λ/D, which may be utilized to scale the solution to −1<sin(DF)<+1, where D represents the distance between the two DF3 antennas. Thus, when λ/D is based upon the nominal value (which may differ from the actual value, as described above), an error may be induced. For example, referring to FIG. 2, the DF error resulting from a range of errors in the array spacing of a particular antenna array is described.

It will be appreciated that the error induced may be a function of the size of the spacing error relative to the length of the antenna array. For example, the induced error for a shorter 10 inch-long array may be larger than the induced error for a longer 60 inch array. It should be noted that while the induced error may be frequency independent, the error may be less apparent at low frequencies where the phase gain of the antenna array is low and the DF accuracy may be relatively poor.

Figure 3:
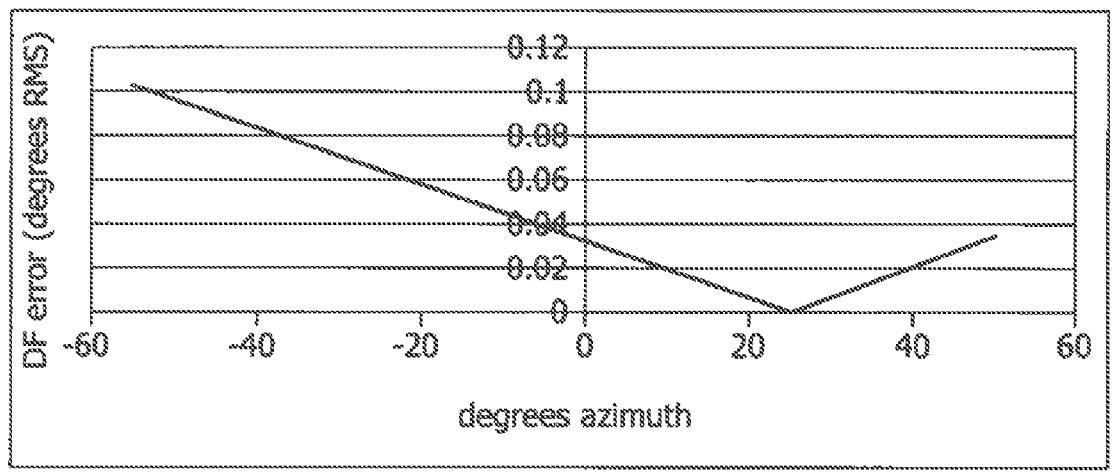
FIG. 3 is a graph illustrating DF errors resulting from thermal expansion and contraction over a range of temperatures for a particular antenna array.

Referring now to FIG. 3, an example of the effects of thermal expansion and contraction over a range of temperatures for an antenna array fabricated primarily from aluminum is described. In the example described in the accompanying figure, the aluminum may have a coefficient of linear expansion of $\alpha = 23 \times 10^{-6}/°$ C. It should be noted that this example assumes the antenna spacing is exact at 25° C. Additionally, for the purposes of illustration, the RMS error was calculated for the azimuth range of +60° to −60° in 10° steps. It will be appreciated that the effect of thermal expansion on DF accuracy may be independent of frequency and/or the length of the antenna array. However, for short antenna arrays with poor accuracy, the effects of thermal expansion and contraction may not be as noticeable as for longer and more accurate antenna arrays. In a specific instance, an error of about 0.1° DF may be induced for an airborne interferometer unit calibrated at room temperature, and operated at an altitude of 35,000 feet (where the temperature may be minus 54° C.).

Referring once again to FIGS. 1A and 1B, the distance between the DF3 antenna elements of a four-element linear phase interferometer antenna assembly may be determined at a known temperature. In embodiments, this distance can be measured in an anechoic chamber (e.g., when the antenna assembly is calibrated and/or recalibrated) by checking the antenna elements at different angles. Alternatively, the distance between the DF3 antenna elements may be measured utilizing a measuring technique with a high degree of accuracy relative to offsets resulting from machining tolerances, such as with a laser scan tool for determining a distance between two points, or the like. It will be appreciated that when determining the distance between two antenna elements, the dimensions of interest may be the distances between the phase centers of the antenna elements.

In embodiments, a placement error correction factor $C_{PCF}$ may be calculated as follows:

$$C_{PCF} = D_{nominal}/D_{actual}$$

where $D_{nominal}$ is the nominal or expected spacing between the antenna elements and $D_{actual}$ is a more precise measurement of the actual spacing between the antenna elements. Additionally, a thermal correction factor $C_{TCF}$ may be calculated as a vector of numbers, with an index based upon a measured temperature for the antenna array. The thermal correction factor may be calculated as follows:

$$C_{TCF}(T) = 1 - (T_{CAL} - T)*\alpha$$

where T is a temperature in degrees Celsius, $T_{CAL}$ is a temperature for calibration, and α is a coefficient of linear expansion (such as $23 \times 10^{-6}/°$ C. for aluminum). In a specific embodiment, a resolution of 5° C. may be utilized for determining the thermal correction factor. In one implementation, this resolution may result in a DF error of less than 0.01° RMS. In another implementation, $T_{CAL}$ may be calculated in real time as a function of a measured temperature for the antenna array and a coefficient of linear expansion for the material/materials from which the antenna array is constructed (e.g., utilizing a coefficient of linear expansion for an aluminum material of $23 \times 10^{-6}/°$ C.).

In some instances, the placement error correction factor may be utilized together with the thermal correction factor. For example, in embodiments where a placement correction factor and a thermal correction factor are both utilized, the calibration temperature $T_{CAL}$ may be the temperature at which the more accurate measurement of the distance between the DF3 antenna elements is taken. In this type of implementation, the two correction factors can be multiplied together to form a single correction factor $C_{BCF}$. Alternatively, a baseline correction factor $C_{BCF}$ may be determined based on only one or another of a placement correction factor, a thermal correction factor, or another correction factor. With specific reference to the generalized algorithm described in FIG. 1A, the multiplication of DFex and L_D does not begin until DF phase correction and the rest of the DF algorithm has been completed. This may provide time to insert an additional multiply operation (L_D×$C_{BCF}$=L_D_corrected) without extending the overall time to calculate the DF solution. Alternatively, with specific reference to the generalized algorithm described in FIG. 1B, a correction factor may be applied to DFex before DFex is multiplied by L_D.

In some instances, the placement error correction factor may be utilized independently of the thermal correction factor. For example, only a placement error correction factor may be computed in one example, while in another example, only a thermal correction factor may be computed. Further, it should be noted that other correction factors may be computed to account for variations in the distance between the antenna elements. For example, a different type of correction factor may be determined and utilized with both the placement error correction factor and the thermal correction factor, with either of the aforementioned correction factors, or even independently from other correction factors. Further, such correction factors may be calculated as a vector of numbers, with an index based upon a measurable physical effect other than temperature. Alternatively, correction factors may be calculated in real time. For example, a thermal correction factor may be calculated and/or recalculated when a temperature change is detected for the antenna array.

Figure 4:
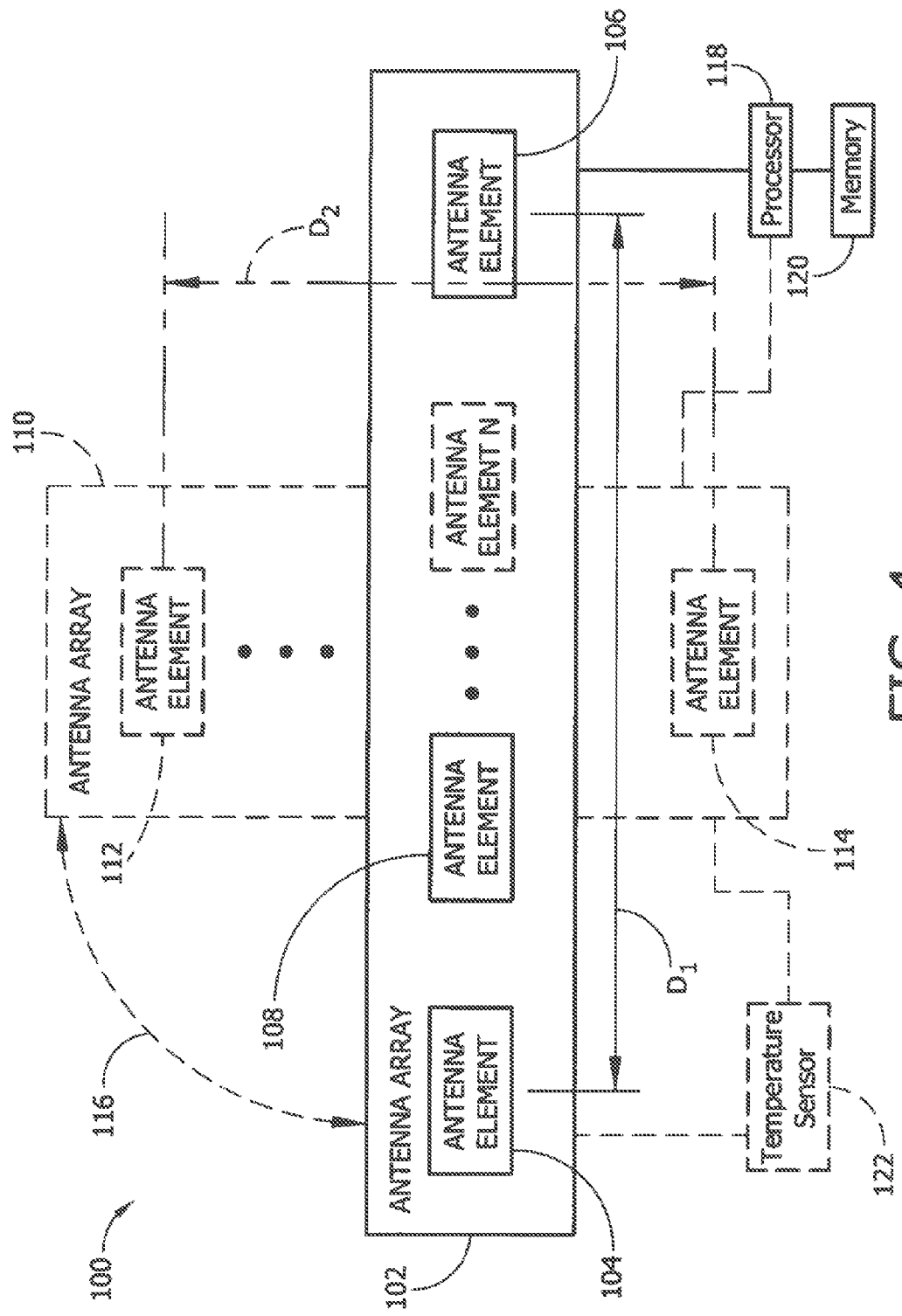
FIG. 4 is a block diagram illustrating an antenna assembly.

Referring now to FIG. 4, an antenna assembly 100 is described in accordance with the present disclosure. The antenna assembly 100 may be implemented as a linear interferometer direction finding antenna assembly including an antenna array 102. The antenna array 102 may have a first antenna element 104, a second antenna element 106, and a third antenna element 108, which may be interposed between the first antenna element 104 and the second antenna element 106. In some embodiments, the antenna array 102 may have additional antenna elements interposed between the first antenna element 104 and the second antenna element 106, such as a fourth antenna element, a fifth antenna element, and possibly other antenna elements as well. For example, the DF algorithm described in FIG. 1 may be implemented utilizing a four antenna array. The antenna elements of the antenna array 102 are spaced apart and generally arranged along an axis to form a linear interferometer direction finding antenna array.

In embodiments, the antenna assembly 100 may include additional antenna arrays. For example, in a specific example, the antenna assembly 100 may include another linear interferometer direction finding antenna array 110. The antenna array 110 may have a first antenna element 112 and a second antenna element 114. The antenna array 110 may have additional antenna elements interposed between the first antenna element 112 and the second antenna element 114. In some instances, an antenna element interposed between the first antenna element 112 and the second antenna element 114 may be shared by the antenna array 102 and the antenna array 110 (e.g., the third antenna element 108 may be part of both the antenna array 102 and the antenna array 110). Alternatively, in other implementations, the antenna elements of the antenna array 110 are not shared with the antenna array 102. For example, the antenna elements of the antenna array 110 may be connected independently of the antenna elements of the antenna array 102.

The antenna elements of the antenna array 110 are generally arranged along an axis that may be oriented in a different direction from the axis of the antenna array 102. For example, the antenna array 102 and the antenna array 110 may be positioned at an angle 116 one relative to the other. It should be noted that while the antenna assembly 100 has been described as including the antenna array 102, and possibly the antenna array 110, the antenna assembly 100 may include other antenna elements and/or antenna arrays, such as a third linear interferometer direction finding antenna array, or the like. Additionally, while the present disclosure specifically describes a linear interferometer direction finding antenna assembly, this example is provided by way of illustration only and is not meant to be restrictive of the present disclosure. Thus, other types of antenna geometries that utilize multiple antenna elements in various other arrangements may be utilized as well. For example, the first antenna element 104 and the second antenna element 106 may be generally arranged along one axis while the first antenna element 104 and the third antenna element 108 may be generally arranged along a different axis.

The first antenna element 104, the second antenna element 106, and the third antenna element 108 of the antenna array 102 are configured to receive signals from a signal source, such as a Radio Frequency (RF) source. For example, in a specific implementation, the antenna elements may receive a signal simultaneously from a signal source when in a bore sight orientation; while in other angular orientations with respect to a signal source, the antennas may receive a signal within a few nanoseconds of one another. The antenna array 102 is coupled with a processor, such as a direction finding processor 118. In one specific example, the direction finding processor 118 may be implemented in firmware with a Field-Programmable Gate Array (FPGA). In embodiments, the antenna array 102 may be coupled with the direction finding processor 118 via RF circuitry or the like.

The direction finding processor 118 is configured to analyze the signals received by the antenna array 102 and utilize a distance between antenna elements of the antenna array 102 to determine a characteristic of the signal source, such as a direction of the signal source (e.g., a direction from the antenna array 102 to an RF emitter as determined utilizing a direction of arrival of an RF signal from the RF emitter), a location of the signal source (e.g., a geo-location solution for an RF emitter), or another characteristic of the signal source. For instance, the direction finding processor 118 may determine a direction and/or a location of a signal source utilizing a relative phase of the signal between two antennas. In some embodiments, the direction finding processor 118 (or another processor) may also be coupled with the antenna array 110 and configured to analyze signals received by the antenna array 110 to determine one or more characteristics of the signal source, as in the case of a linear interferometer direction finding antenna assembly capable of computing information about an RF signal source in two dimensions.

The direction finding processor 118 is coupled with a memory, such as electronic memory 120, or the like, for storing one or more correction factors for determining/computing characteristics of the signal source. In some embodiments, the memory 120 may be included with the direction finding processor 118, such as in implementations where the memory 120 is implemented as a processor register on a Central Processing Unit (CPU) of the direction finding processor 118. In other embodiments, the memory 120 may be provided separately from the direction finding processor 118, such as in implementations where the memory 120 is implemented as Read Only Memory (ROM), Random Access Memory (RAM), flash memory, or the like. For example, the direction finding processor 118 may be configured to utilize a correction factor stored in memory 120 to determine the distance $D_1$ between the first antenna element 104 and the second antenna element 106 and/or the distance $D_2$ between the first antenna element 112 and the second antenna element 114. The determined distance between the antenna elements may be based on a nominal distance, which may be corrected utilizing a correction factor stored in the electronic memory 120, as previously described. For example, a correction factor may include a placement error correction factor, a thermal correction factor, or another type of correction factor.

In embodiments, the antenna assembly 100 may include a temperature sensor 122 for sensing a temperature associated with the antenna array 102 and/or the antenna array 110, such as a temperature sensor mounted to the faceplate of the antenna assembly. In this type of configuration, a correction factor may then be determined based upon the temperature sensed by the temperature sensor 122. For example, system software may monitor the base plate temperature of the antenna assembly 100 during system operation, and then, based upon a temperature reading, the system software may load/calculate the correct baseline correction factor $C_{BCF}$ for the current base plate temperature.

Figure 5:
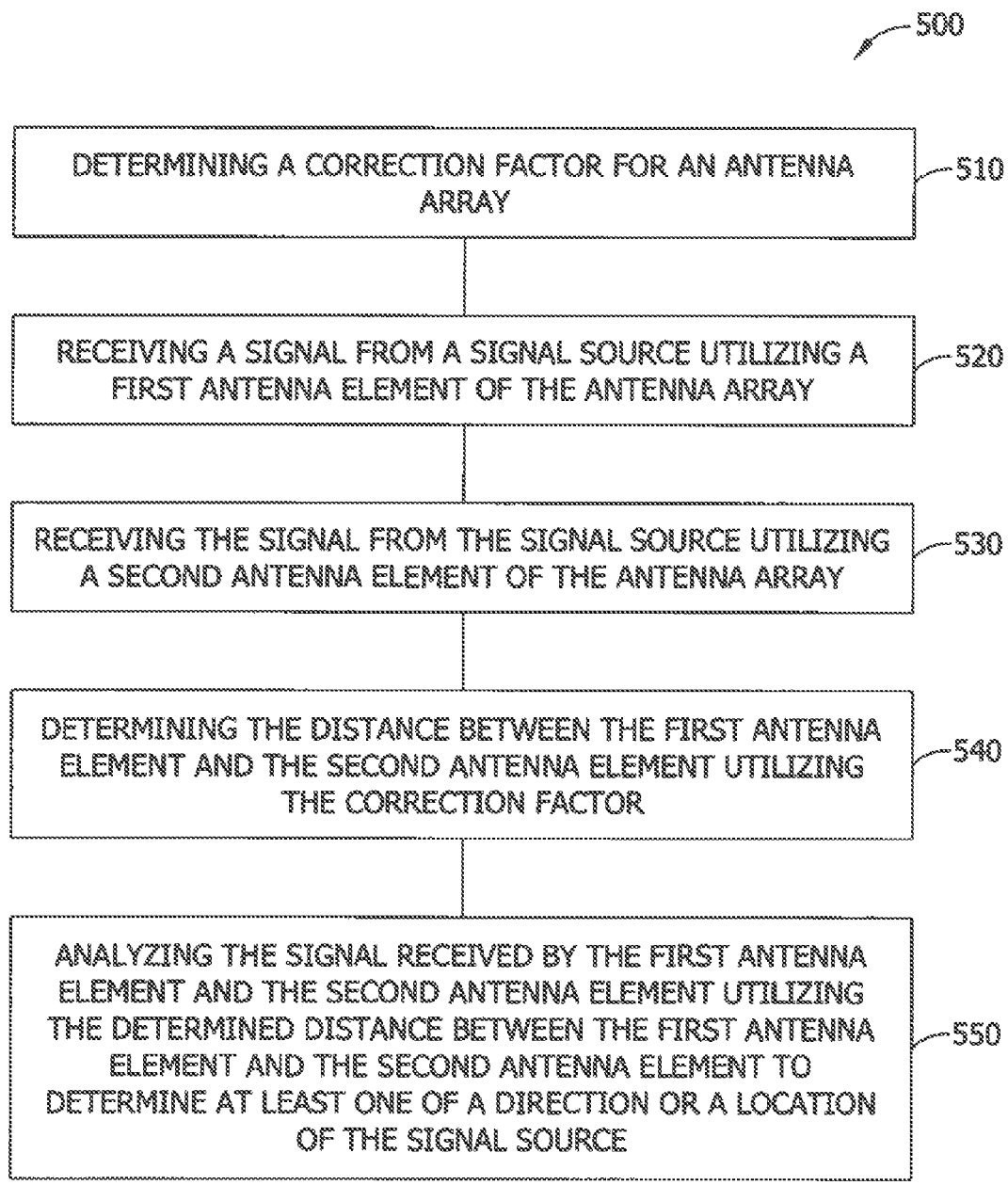
FIG. 5 is a flow diagram illustrating a method for managing a position error of a plurality of antenna elements within an antenna assembly.

Referring now to FIG. 5, a method 500 for managing a position error of antenna elements within an antenna assembly is described. The method 500 may include determining a correction factor for an antenna array, 510. The method 500 may also include receiving a first signal from a signal source utilizing a first antenna element of the antenna array, 520. The method 500 may further include receiving a second signal from the signal source utilizing a second antenna element of the antenna array, 530 The second antenna element may be spaced a distance apart from the first antenna element. The method 500 may also include determining the distance between the first antenna element and the second antenna element utilizing the correction factor, 540. The method 500 may further include analyzing the first signal and the second signal utilizing the determined distance between the first antenna element and the second antenna element to determine at least one of a direction or a location of the signal source, 550.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. An antenna assembly, comprising:
   an antenna array having a plurality of antenna elements generally arranged along an axis, the antenna array including:
      a first antenna element for receiving at least one signal from a signal source, and
      a second antenna element spaced a distance apart from the first antenna element for receiving the at least one signal from the signal source;
   a processor coupled with the antenna array for analyzing the at least one signal received by the first antenna element and the second antenna element and utilizing the distance between the first antenna element and the second antenna element to determine at least one of a direction or a location of the signal source; and
   a memory coupled with the processor for storing a correction factor, where the processor is configured to utilize the correction factor to determine the distance between the first antenna element and the second antenna element.

2. The antenna assembly of claim 1, wherein the correction factor includes at least one of a placement error correction factor or a thermal correction factor.

3. The antenna assembly of claim 1, wherein the antenna assembly further includes:
   a temperature sensor for sensing a temperature associated with the antenna array, where the correction factor is determined based upon the sensed temperature.

4. The antenna assembly of claim 1, wherein the correction factor includes a placement error correction factor and a thermal correction factor, and where a calibration temperature for the thermal correction factor is at least substantially the same as a temperature at which the placement error correction factor is determined.

5. The antenna assembly of claim 1, wherein the antenna array further includes:
   a third antenna element for receiving the at least one signal from the signal source, where the processor is configured for analyzing the at least one signal received by the first antenna element, the second antenna element, and the third antenna element to determine at least one of a direction or a location of the signal source.

6. The antenna assembly of claim 5, wherein the third antenna element is interposed between the first antenna element and the second antenna element generally along the axis of the antenna array, and where the antenna assembly is configured as a linear interferometer direction finding antenna assembly.

7. The antenna assembly of claim 1, further comprising:
   a second antenna array having a plurality of antenna elements generally arranged along a second axis oriented in a different direction from the first axis of the first antenna array, the second antenna array including:
      a third antenna element for receiving the at least one signal from the signal source, and
      a fourth antenna element spaced apart from the third antenna element for receiving the at least one signal from the signal source, where the processor is coupled with the second antenna array for analyzing the at least one signal received by the third antenna element and the fourth antenna element to determine at least one of a direction or a location of the signal source.

8. A method for managing a position error of a plurality of antenna elements within an antenna assembly, comprising:
   using a computer or processor to perform the steps of
   determining a correction factor for an antenna array;
   receiving at least one signal from a signal source utilizing a first antenna element of the antenna array;
   receiving the at least one signal from the signal source utilizing a second antenna element of the antenna array, where the second antenna element is spaced a distance apart from the first antenna element;
   determining the distance between the first antenna element and the second antenna element utilizing the correction factor; and
   analyzing the at least one signal received by the first antenna element and the second antenna element utilizing the determined distance between the first antenna element and the second antenna element to determine at least one of a direction or a location of the signal source.

9. The method of claim 8, wherein the correction factor includes at least one of a placement error correction factor or a thermal correction factor.

10. The method of claim 8, further comprising:
    sensing a temperature associated with the antenna array; and
    determining the correction factor based upon the sensed temperature.

11. The method of claim 8, wherein the correction factor includes a placement error correction factor and a thermal correction factor, and where a calibration temperature for the thermal correction factor is at least substantially the same as a temperature at which the placement error correction factor is determined.

12. The antenna assembly of claim 8, further comprising:
  receiving the at least one signal from the signal source utilizing a third antenna element of the antenna array; and
  analyzing the at least one signal received by the first antenna element, the second antenna element, and the third antenna element to determine at least one of a direction or a location of the signal source.

13. The antenna assembly of claim 12, wherein the third antenna element is interposed between the first antenna element and the second antenna element generally along an axis of the antenna array, and where the antenna assembly is configured as a linear interferometer direction finding antenna assembly.

14. The antenna assembly of claim 8, further comprising:
  receiving the at least one signal from the signal source utilizing a third antenna element of a second antenna array,
  receiving the at least one signal from the signal source utilizing a fourth element of the antenna array; and
  analyzing the at least one signal received by the third antenna element and the fourth antenna element to determine at least one of a direction or a location of the signal source.

15. A linear interferometer direction finding antenna assembly, comprising:
  an antenna array having a plurality of antenna elements generally arranged along an axis, the antenna array including:
    a first antenna element for receiving at least one signal from a signal source,
    a second antenna element spaced a distance apart from the first antenna element for receiving the at least one signal from the signal source, and
    a third antenna element interposed between the first antenna element and the second antenna element generally along the axis of the antenna array for receiving the at least one signal from the signal source;
  a processor coupled with the antenna array for analyzing the at least one signal received by the first antenna element, the second antenna element, and the third antenna element utilizing the distance between the first antenna element and the second antenna element to determine at least one of a direction or a location of the signal source; and
  a memory coupled with the processor for storing a correction factor, where the processor is configured to utilize the correction factor to determine the distance between the first antenna element and the second antenna element.

16. The linear interferometer direction finding antenna assembly of claim 15, wherein the correction factor includes at least one of a placement error correction factor or a thermal correction factor.

17. The linear interferometer direction finding antenna assembly of claim 15, wherein the antenna assembly further includes:
  a temperature sensor for sensing a temperature associated with the antenna array, where the correction factor is determined based upon the sensed temperature.

18. The linear interferometer direction finding antenna assembly of claim 15, wherein the correction factor includes a placement error correction factor and a thermal correction factor, and where a calibration temperature for the thermal correction factor is at least substantially the same as a temperature at which the placement error correction factor is determined.

19. The linear interferometer direction finding antenna assembly of claim 15, further comprising:
  a second antenna array having a plurality of antenna elements generally arranged along a second axis oriented in a different direction from the first axis of the first antenna array, the second antenna array including:
    a third antenna element for receiving the at least one signal from the signal source, and
    a fourth antenna element spaced apart from the third antenna element for receiving the at least one signal from the signal source, where the processor is coupled with the second antenna array for analyzing the at least one signal received by the third antenna element and the fourth antenna element to determine at least one of a direction or a location of the signal source.

* * * * *